T. A. EDISON.
Duplex Chemical Telegraphs.
No. 156,843. Patented Nov. 17, 1874.
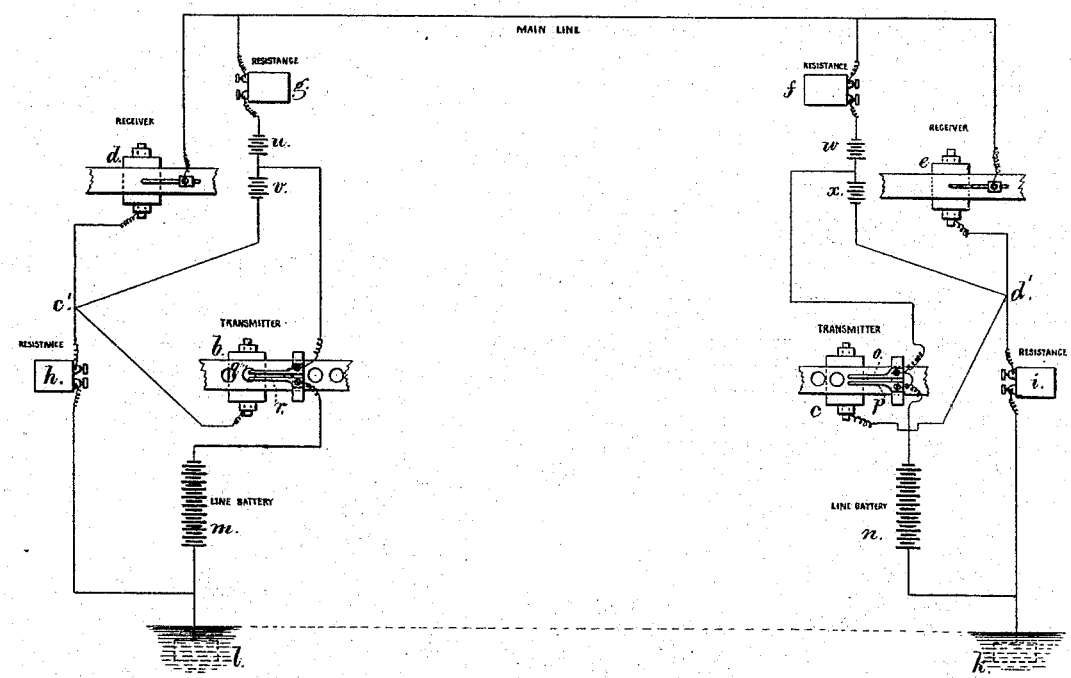

UNITED STATES PATENT OFFICE

THOMAS A. EDISON, OF NEWARK, NEW JERSEY, ASSIGNOR TO HIMSELF AND GEORGE HARRINGTON, OF WASHINGTON, DISTRICT OF COLUMBIA.

IMPROVEMENT IN DUPLEX CHEMICAL TELEGRAPHS.

Specification forming part of Letters Patent No. 156,843, dated November 17, 1874; application filed March 13, 1873.

CASE 69.

*To all whom it may concern:*

Be it known that I, THOMAS A. EDISON, of Newark, in the county of Essex and State of New Jersey, have invented an Improvement in Circuits for Chemical Telegraphs, of which the following is a specification:

The object of this invention is to transmit two dispatches over the same wire at the same time by telegraphs employing perforated transmitting-paper and chemical receiving-paper.

I make use of apparatus for transmitting by perforated paper, and receiving the messages on chemical paper at the respective ends of the line, and employ batteries, resistances, and connections arranged in such a manner that the effect of the transmitting-battery shall be neutralized upon the receiving-instrument at the same end by an equalization of tensions, and the receiver shall be at a point where the tension is equal to all the electric currents, except to that current which comes from the distant station.

In the diagram, $d\ e$ are the receiving, and $b\ c$ the transmitting, instruments. $m\ n$ are the main batteries. $u$ and $v$ are two batteries in the shunt-circuit opposing each other, and producing no effect upon the receiver. $w\ x$ are batteries operating similar to $u\ v$. $f\ g$ are resistance-coils, to increase and decrease the length of the shunt-circuits. $h\ i$ are resistance-coils of nearly the resistance of the line. $k\ l$ are the ground-plates. $o\ p$ are the double contact-springs, one spring, $o$, cutting off or "short-circuiting" the battery $x$, and the other spring, $p$, placing the main battery $n$ upon the line. This main-battery current divides at $d'$, part going on the line and part to the ground, this route or negative of the battery through the resistance $i$ being in fact an artificial line, it being well known that a battery will supply several lines with an undiminished quantity of electricity, and that the addition of a line decreases the total resistance of the battery's circuit, and produces an extra amount of electricity.

To obtain the transmission of two messages over the same wire at the same instant, it is only necessary that no effect shall be obtained upon the receiving-instrument by the putting on of the sending-battery at the same station.

I will now describe how I produce this effect: When the paper of the message to be transmitted intervenes between the contact-springs $q\ r$ and the drum $b$, no current passes upon the line, and the batteries $u\ v$, being balanced within the shunt-circuit, produce no effect upon the receiver $d$, and a current coming from a distant station passes down the shunt, and also through the receiver $d$, and produces the message in the usual manner.

Supposing no current from the distant station was recording itself upon the receiver $d$, and it is desired to transmit a current to the distant station without producing any effect upon said receiver $d$, it is accomplished as follows:

When the contact-springs $q\ r$ are in metallic contact with the drum $b$, by passing into a perforation in the paper being drawn over said drum, the current from the battery $m$ passes by $r$ over the line, but it splits in three directions at $c'$, part passing to the ground, and part passing by two routes to the line, via the shunt and the receiver $d$. The passage of the current through the receiver would give a large mark at the receiver were it not that at the same time that the contact-spring $r$ placed the battery $m$ upon the line the spring $q$ short-circuited the battery $v$, which had been opposing the battery $u$ in the shunt, hence allowing said battery $u$ to have free action, and the current from this battery thus set free acts in a contrary direction through the receiving-instrument $d$ to that of the battery $m$, and by means of a switch for putting in and out more or less cups the power of the batteries $m$ and $u$ are neutralized on the chemical paper at $d$; consequently no effect is produced at the receiver $d$ when the battery $m$ is placed on the line.

Of course, while the battery $m$ is on, if a current from the battery $n$ is sent over the line it records itself in the usual manner upon the chemical paper on $d$.

I claim as my invention—

The local batteries $u$ and $v$ or $w$ and $x$ in a shunt from the main line and opposing each other, and a connection between them to the transmitting or receiving instrument, in combination with the main batteries, resistances, and circuits, arranged substantially as and for the purposes set forth.

Signed by me this 7th day of March, A. D. 1873.

THOMAS A. EDISON.

Witnesses:
GEO. T. PINCKNEY,
CHAS. H. SMITH.